Feb. 15, 1955     L. E. BARTON     2,702,379
SOUND WAVE DIRECTION FINDING SYSTEM
Filed Sept. 26, 1944
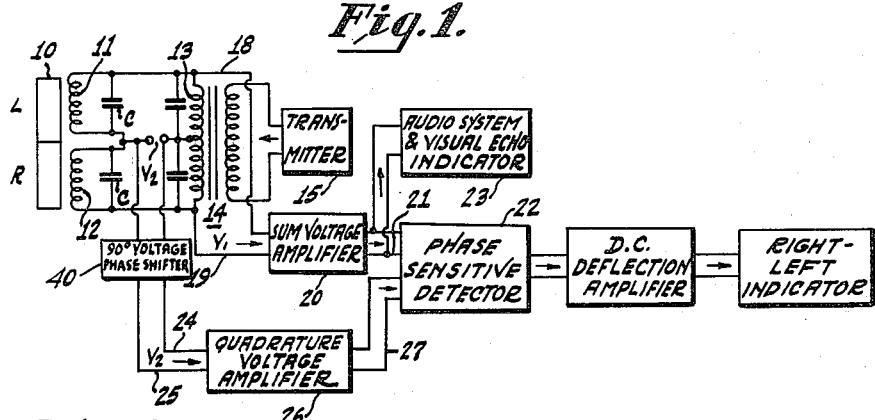
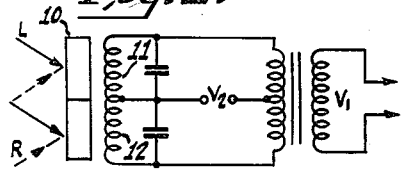
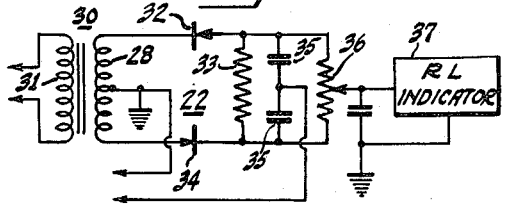
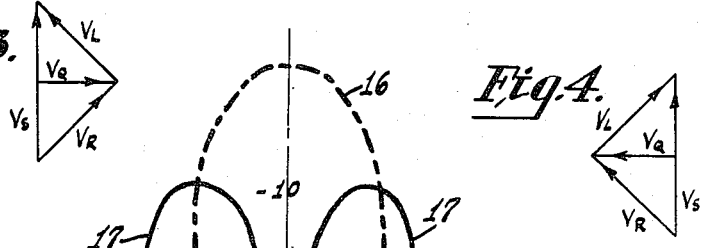
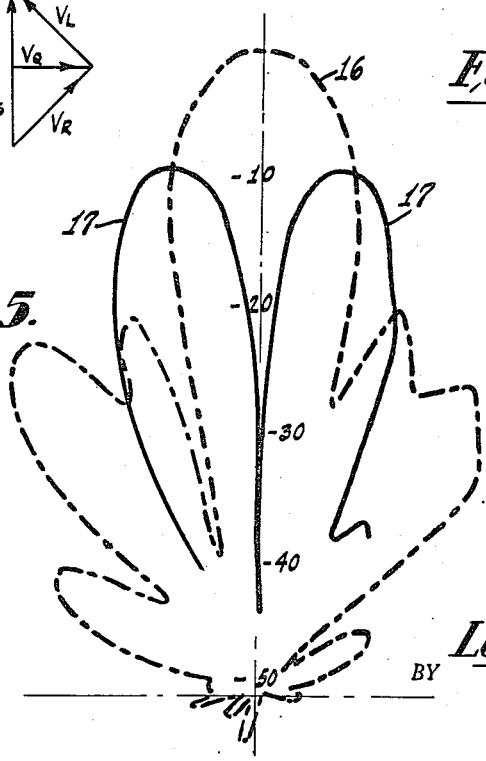
INVENTOR.
*Loy E. Barton*
BY
*ATTORNEY*

United States Patent Office 2,702,379
Patented Feb. 15, 1955

2,702,379

SOUND WAVE DIRECTION FINDING SYSTEM

Loy E. Barton, Collingswood, N. J., assignor to Radio Corporation of America, a corporation of Delaware Application September 26, 1944, Serial No. 555,797

6 Claims. (Cl. 340—6)

The present invention relates to bearing deviation indicator systems, and more particularly to such a system for use with echo ranging equipment.

In echo ranging equipment heretofore in use, the accuracy of bearing indication was unsatisfactory for the purpose intended, errors predominated to confuse the observers, and the equipment proved heavy and cumbersome. If the projector beam pattern was made narrow enough to approximate a bearing indication by the audible drop in the echo intensity, it was extremely difficult to find the target and to maintain contact with it. If a broad beam pattern was used to facilitate searching, an accurate bearing indication was impossible. Attempts were made to overcome the defects of these systems by overlapping lobes including the echo signal, the received signals were amplified and were passed on to a right-left detector and thence to a right-left indicator. In systems of this type, the zero deviation indication and the magnitude of this indication are directly affected by phase shift and variations in the amplifier which result in errors of appreciable magnitude.

Some of the objects of the present invention are to provide an improved bearing deviation indicating system for finding the direction of the sound wave; to provide a light weight ranging equipment giving accurate bearing deviation indication; to provide a bearing deviation system which is relatively independent of phase shift and amplitude variations in an amplifier; to provide a bearing deviation indicating system wherein the halves of a transducer, split electrically along the vertical, central line are connected in series to produce a normal beam pattern and to obtain an amplitude and phase reference voltage against which a quadrature voltage may be compared as regards phase and amplitude. The quadrature voltage is obtained by connecting the center of a pair of series transducer coils to the center tap of a transformer connected to the terminals of the series output of the transducer coils.

As the sound source deviates from the axis of the normal beam, the phase of the voltage generated in the series coils changes, thereby producing a quadrature voltage or a voltage that is at 90° with respect to the voltage across the transformer terminals. The direction and amplitude of this quadrature voltage (which is obtained between the transformer center tap and the junction of the series transducer coils) as compared with the reference voltage across the transformer terminals gives an indication of the direction of the sound. In case it is only necessary to know when the transducer is pointed directionally at a sound source, the transducer is moved in the direction of the sound until the quadrature voltage becomes zero. To know whether the sound is to the left or right of the transducer beam axis, a system is provided to indicate whether the quadrature voltage leads or lags the reference or beam voltage by approximately 90°. It will be seen that a transducer, so connected with a suitable transformer or choke having a center tap, may receive all the information for bearing deviation indication.

Other objects and advantages of my present invention will be apparent from the following description of the accompanying drawings, in which:

Figure 1 represents a block diagram of a beam deviation indicating system embodying one form of the present invention, Figure 2 represents the input circuit of the receiver for the system of the present invention, Figure 3 represents a diagram illustrating by vectors the voltages from a signal source reaching the left side of a transducer before the right side, Figure 4 represents a diagram illustrating by vectors the voltages from a signal source reaching the right side of a transducer before the left side, Figure 5 represents a beam pattern with vector sum and quadrature voltages plotted against the bearing of the sound source on polar coordinates, and Figure 6 represents one output circuit of the system.

Figure 6 represents one output circuit of the system.

Referring to the drawings, and more particularly to Fig. 2, a transducer 10 is shown diagrammatically and is of the type which is split electrically along the vertical axis to provide two separate parts L and R, one-half L thereof lying in close proximity to and juxtaposed with respect to one portion 11 of a pair of series connected coil sections 11 and 12, and the other half R thereof lying in close proximity to and juxtaposed with respect to the other coil section 12. In actual practice, there is no dividing line in the diaphragm of the transducer 10. The coil portions 11 and 12 are in series with the primary coil 13 of a transformer 14, while the center tap of the coil 13 joins the two halves of the transducer 10 in parallel relation in the network. The capacitors C are of such a value as to tune each half of the transducer to electrical resonance at the operating frequency.

The output voltage $V_1$ developed across the primary of the transformer 14 will vary in proportion to the vector sum of the voltages developed in the coils 11 and 12 on the right and left sides of the transducer, because these two voltages are in series with the primary coil 13. The voltage at $V_2$ will vary as the vector difference of the voltages in each side, since the transducer halves are connected to the terminals at $V_2$ in parallel with the center tap as the common lead. It will be shown that the voltages $V_1$ and $V_2$ are in quadrature and that the relative phase of the voltages reverses when signals are applied from alternate sides of the transducer axis. The impedance offered by the transformer primary to the voltage at $V_2$ is negligible because any current flowing into a load at $V_2$ is in opposition in the halves of the transformer primary tending to cancel the inductance. Thus if a signal is received from a source directly in front of the transducer, the voltages induced in each half will be equal and in phase, so that $V_1$ will represent their algebraic sum, and $V_2$, their difference, will be zero. If a signal is received from the left of the transducer, as shown by the solid lines in Fig. 2, the electromotive force induced in the left side will lead the electromotive force induced in the right side, due to the difference in time required for the wave to reach the respective sides.

Referring to Fig. 3 and assuming a counter-clockwise rotating vector system, the voltages from the left and right sides are represented by $V_L$ and $V_R$ respectively. These voltages are equal in magnitude and the angle between them is proportional to the sine of the angle of incidence of the received wave. The vector sum of these voltages is $V_S$, and $V_Q$ is the quadrature component.

If the signal source is toward the right side of the transducer, as shown by the dotted arrows in Fig. 2, the voltage from the right half will lead the voltage from the left half, as represented by the vectors $V_R$ and $V_L$ in Fig. 4. $V_S$ and $V_Q$ are again the vector sum and the quadrature voltages, respectively.

By examination of Figs. 3 and 4, it will be seen that, as long as the magnitudes of $V_R$ and $V_L$ are equal, $V_S$ and $V_Q$ will bear a 90° phase relationship, no matter what the value of the angle between $V_R$ and $V_L$. The difference voltage $V_Q$ will change phase 180° when $V_R$ and $V_L$ are in phase, that is, when the source of the sound is directly in front of the transducer, and will increase in magnitude as the angular deviation is increased until $V_R$ and $V_L$ are in phase opposition. The increase of $V_Q$ is extremely rapid for small values of $\phi$, namely, the angle between $V_R$ and $V_L$.

If $V_S$ is used as a reference, it will be seen that, when the sound arrives from a source slightly toward the left side of the transducer, $V_Q$ will lag 90° behind $V_S$, and when it arrives from a source slightly toward the right, $V_Q$ will lead by 90°. The lead and lag in this relationship may be interchanged by reversing either $V_Q$ or $V_S$ but the principle will be unchanged. This phase relationship remains valid as φ is increased until $V_R$ is in opposition to $V_L$. At this point, the sum $V_S$ changes phase and the lead and lag relationship between $V_S$ and $V_Q$ is interchanged. This will cause a reversal in the bearing deviation indication. This change occurs when $V_S$ is zero; namely, at the null on either side of the major lobe of the transducer.

From the foregoing description, it will be seen that the voltages $V_S$ and $V_Q$ obtained directly from the input circuit carry the complete intelligence of the bearing deviation indication. The magnitude of $V_Q$ is a function of the bearing deviation and its phase relationship with $V_S$ is an indication of the direction of deviation. Therefore, it is only necessary to amplify these voltages and to rectify $V_Q$ in a phase sensitive rectifier to obtain the bearing deviation indication voltage. Since $V_Q$ is zero when the bearing deviation is zero, the amount of amplification used will have no effect on the accuracy of the zero deviation indication. The 180° phase shift occurring in $V_Q$ takes place at zero deviation, and $V_Q$ is always in quadrature with $V_S$, so if a phase sensitive rectifier, which uses only the component of the amplified $V_Q$ in quadrature with the amplified $V_S$, is used to obtain the bearing deviation indication voltage, the only effect of a difference in phase shift in the two amplifiers will be a decrease in the sensitivity of the deviation indication in proportion to the cosine of this difference angle. From this, it will be seen that the accuracy of the zero deviation indication is unaffected by gain or phase shift differences in the two amplifiers.

Referring to the block diagram of Fig. 1, a suitable sound transmitter 15 is coupled to the transformer 14 and serves to emit a succession of sound pulses while the transducer 10 may be swung in an arc to cover any desired field of observation. Thus, in Fig. 5, the beam pattern 16 represents the sum voltage plotted against the bearing of the sound source at zero bearing as fifty decibels, while the pattern 17 represents the quadrature voltages likewise plotted. The sound received by the transducer generates a sum voltage $V_1$ and a quadrature voltage $V_2$, which voltages produce a zero indication when the target is coincident with the axis of the transducer, but give a plus or minus derivation when the sounds are received from a target on the respective sides of the axis. The sum voltage $V_1$ output of the transducer is applied by conductors 18 and 19 to a sum amplifier 20. The output 21 of the sum amplifier is applied to a phase sensitive detector 22 and also to an audio system and visual indicator 23. The audio system provides an indication that a target is within the field of the transmitted beam and the visual indicator may indicate the range of the target. The quadrature voltage $V_2$ output of the transducer, after being shifted 90° by a voltage phase shifter 40, is applied by conductors 24 and 25 to a quadrature voltage amplifier 26. The output 27 of the amplifier 26 is also applied to the phase sensitive detector 22.

The phase sensitive detector 22, as shown in Fig. 6, comprises a network including a secondary coil 28 of a transformer 30 of which the primary coil 31 forms the input of the phase detector. The sum voltage is applied to the primary 31. The coil 28 is in series with a rectifier 32, resistance 33 and a second rectifier 34. The quadrature voltage, after being shifted approximately 90°, is applied to the center tap of the coil 28 and to the junction of a pair of by-pass capacitors 35, so that the network includes two circuits in parallel, each of which includes one of the aforesaid rectifiers. Thus, it will be seen that the sum voltage and quadrature voltage are in series aiding on the rectifier 32 and in series bucking on the rectifier 34 for one direction of the quadrature voltage. For the opposite direction of quadrature voltage, the action is reversed. The output circuit 36 of the phase detector delivers direct current of plus or minus polarity to the right left indicator 37, from which the angular deviation of the target from the transducer axis is made known.

It will now be apparent that the invention resides in the fact that when the halves of a transducer, split electrically along the vertical center line, are connected as described, a quadrature beam pattern is obtained which has an extremely sharp dip when the sound source is on the transducer axis. This is illustrated in Fig. 5 wherein the quadrature pattern undergoes a sudden 180° phase reversal at zero bearing and is at least thirty decibels lower than the maximum value of this voltage. This enables an extremely accurate determination of the zero bearing even in the case of a transducer with the broadest beam pattern and gives the sense, right or left, of the bearing indication. It should be noted particularly that, in accordance with the present invention, the reference and quadrature or direction voltages are obtained directly from the input or transducer circuit so that the zero indication and the direction of this indication is relatively independent of phase shift and amplitude variations in the amplifier.

I claim as my invention:

1. In a direction finding system responsive to sound waves, a split transducer including separate windings for obtaining electromotive forces from the applied sound waves the direction of which is to be determined, means responsive to the energization of said windings for obtaining a reference electromotive force and a second electromotive force in quadrature relation to said reference electromotive force, means for shifting the phase of said second electromotive force the order of 90°, means for combining algebraically voltages corresponding to said reference electromotive force and to said phase shifted electromotive force, and means for indicating the polarity of the resultant voltage thereby to indicate the direction of arrival of said sound waves.

2. In a system for direction finding by sound, transducer means arranged under impact of a sound wave to generate two voltages of different phase, means for obtaining the sum of said two voltages and a quadrature voltage from said two voltages, means for shifting the quadrature voltage to produce an output voltage of predetermined phase, a network for receiving said sum voltage and said output voltage of predetermined phase, means in said network for detecting a change of phase between said predetermined output voltage and said sum voltage, and means including an output circuit responsive to the detected voltage for indicating the direction of said sound wave as a function of the phase change.

3. In a system for direction finding by sound, an indicator responsive to positive and negative voltages for indicating the direction of a sound wave, a network including means to rectify alternating current and deliver direct current to said indicator, said network also including means to detect a change of phase between two control voltages which initiate said positive and negative voltages, an input circuit arranged to deliver said control voltages to said network, means to change a quadrature voltage relation of said two control voltages to an in phase or to an out of phase relation for delivery to said input circuit, and means responsive to a received sound wave for generating the two control voltages in quadrature relation.

4. In a direction finding system responsive to sound waves, a split transducer, a network including separate windings in series relation juxtaposed to said transducer, said network being responsive to a sound wave received by said transducer to generate two voltages as a function of the angle of incidence of the received sound wave upon the transducer, one of said voltages forming a maximum signal voltage as the sum of the received components, and the other forming a minimum signal voltage bearing a 90° phase displacement with respect to the maximum signal voltage, means to shift the phase of one of said signal voltages into or out of phase with respect to the other signal voltage, means to mix said last mentioned voltages, means to detect the phase relation between said mixed voltages, and means responsive to said detecting means for indicating the direction of the received sound wave as a function of the relation.

5. In a direction finding system responsive to sound waves, a split transducer, a network including separate windings in series relation juxtaposed to said transducer, said network being responsive to a sound wave received by said transducer to generate two voltages in phase quadrature relationship, one of said voltages forming a maximum signal voltage as the sum of the received components, and the other forming a minimum signal voltage bearing said quadrature phase relationship, means to shift the phase of said minimum signal voltage into or out of phase with respect to the maximum signal voltage according to the angle of incidence of the received sound wave, means to respectively amplify said voltages, means to mix said amplified voltages in said shifted phase relation, means to detect an in or an out of phase relation between said mixed voltages, and means responsive to said detecting means for indicating the direction of the received sound wave as a function of the phase relation.

6. In a direction finding system responsive to sound waves, a split transducer, a network including separate windings in series relation juxtaposed to said transducer, said network being responsive to a sound wave received by said transducer to generate two voltages in quadrature as a function of the angle of incidence of the received sound wave upon the transducer, one of said voltages forming a maximum signal voltage as the sum of the received components, and the other forming a minimum signal voltage bearing said quadrature phase relationship, means to shift the phase of said minimum signal voltage into a relation to the maximum signal voltage to be in or out of phase with said maximum signal voltage according to the said angle of incidence of the received sound wave, means to respectively amplify said voltages, means to mix said amplified voltages in said shifted phase relation, means to detect an in phase or an out of phase relation between said mixed voltages, means to rectify said detected phase change voltage, and means actuated by said rectified voltage to indicate the direction of the received sound wave as a function of the phase relation.

References Cited in the file of this patent

UNITED STATES PATENTS

| Number | Name | Date |
|---|---|---|
| 1,357,210 | Robinson | Oct. 26, 1920 |
| 1,591,252 | Walker | July 6, 1926 |
| 1,839,290 | Bailey | Jan. 5, 1932 |
| 1,955,505 | Kruesi et al. | Apr. 17, 1934 |
| 1,968,068 | Blancard et al. | July 31, 1934 |
| 1,973,673 | Rice | Sept. 11, 1934 |
| 2,077,401 | Crosby | Apr. 20, 1937 |
| 2,166,991 | Guanella | July 25, 1939 |
| 2,349,370 | Orner | May 23, 1944 |